(12) United States Patent
Wu

(10) Patent No.: US 9,365,457 B2
(45) Date of Patent: Jun. 14, 2016

(54) INORGANIC FOAM MATERIAL AND LOW-TEMPERATURE MANUFACTURING METHOD FOR THE SAME

(71) Applicant: Spring Pool Glass Industrial Co., Ltd., Hsinchu (TW)

(72) Inventor: Ting-An Wu, Hsinchu (TW)

(73) Assignees: Ting-An Wu, Hsinchu (TW); SPRING POOL GLASS INDUSTRIAL CO., LTD., Hsinchu (TW)

( * ) Notice: Subject to any disclaimer, the term of this patent is extended or adjusted under 35 U.S.C. 154(b) by 176 days.

(21) Appl. No.: 14/175,576

(22) Filed: Feb. 7, 2014

(65) Prior Publication Data

US 2014/0224155 A1 Aug. 14, 2014

(30) Foreign Application Priority Data

Feb. 8, 2013 (TW) .............................. 102105139 A

(51) Int. Cl.
*C04B 28/04* (2006.01)
*C04B 38/02* (2006.01)

(52) U.S. Cl.
CPC ................. *C04B 28/04* (2013.01); *C04B 38/02* (2013.01); *C04B 2201/20* (2013.01); *C04B 2201/32* (2013.01)

(58) Field of Classification Search
CPC .... C04B 28/04; C04B 38/02; C04B 2201/20; C04B 2201/32
See application file for complete search history.

(56) References Cited

U.S. PATENT DOCUMENTS

| 3,867,159 A * | 2/1975 | Ergene | .................... C04B 28/02 106/646 |
| 2005/0045069 A1 * | 3/2005 | McCarthy | ............... C04B 28/02 106/716 |

FOREIGN PATENT DOCUMENTS

CN 102795878 * 11/2012

OTHER PUBLICATIONS

New World Encyclopedia, entry for Room Temperature, p. 1-3, retrieved Sep. 23, 2015.*
Netafim, Mesh vs. Micron Comparison Chart, p. 1, retrieved Sep. 23, 2015.*

* cited by examiner

*Primary Examiner* — Robert Jones, Jr.
(74) *Attorney, Agent, or Firm* — Locke Lord LLP; Tim Tingkang Xia, Esq.

(57) ABSTRACT

The disclosure provides a low-temperature manufacturing method for an inorganic foam material including the following steps. A mixing process is performed, and the mixing process includes mixing a glass and a cement to form a raw material of inorganic foam material. A low temperature process is performed, for producing a gas inside the raw material of inorganic foam material by a foaming agent, and for forming an inorganic foam material made from the glass and the cement. The manufactured inorganic foam material has a low density, a high compressive strength and is capable of insulating heat. Also, the manufactured inorganic foam material has advantages of noise insulation, thermal insulation, fireproof, as well as featuring lower water absorption and lower shrinkage.

10 Claims, 1 Drawing Sheet

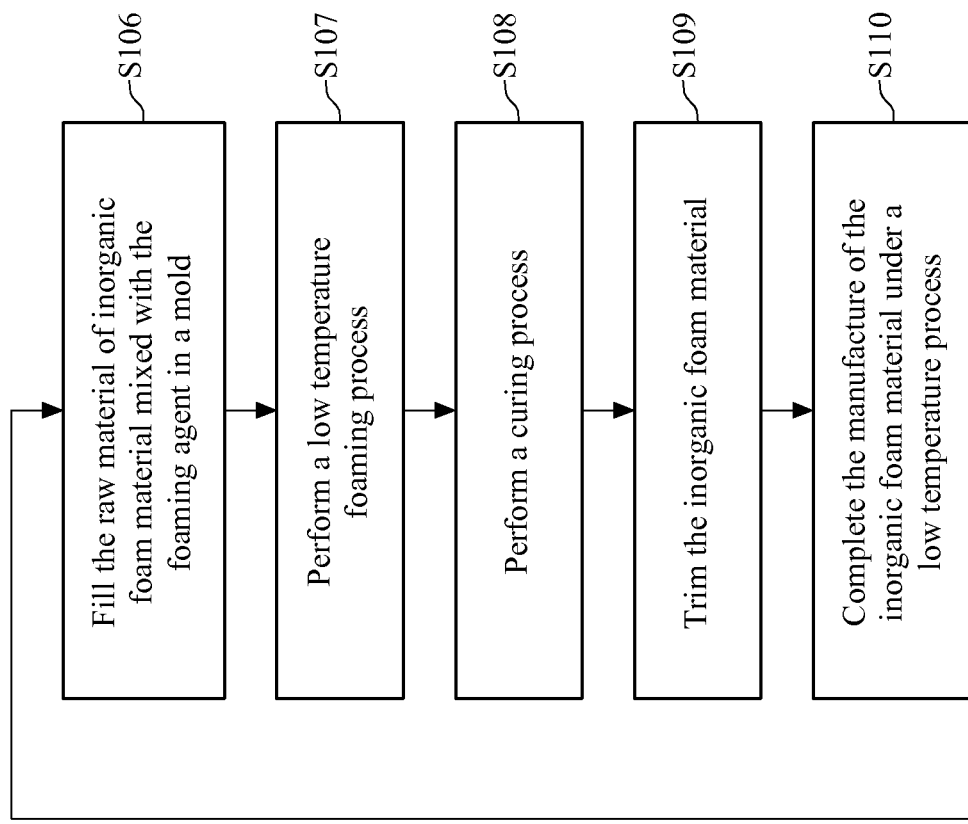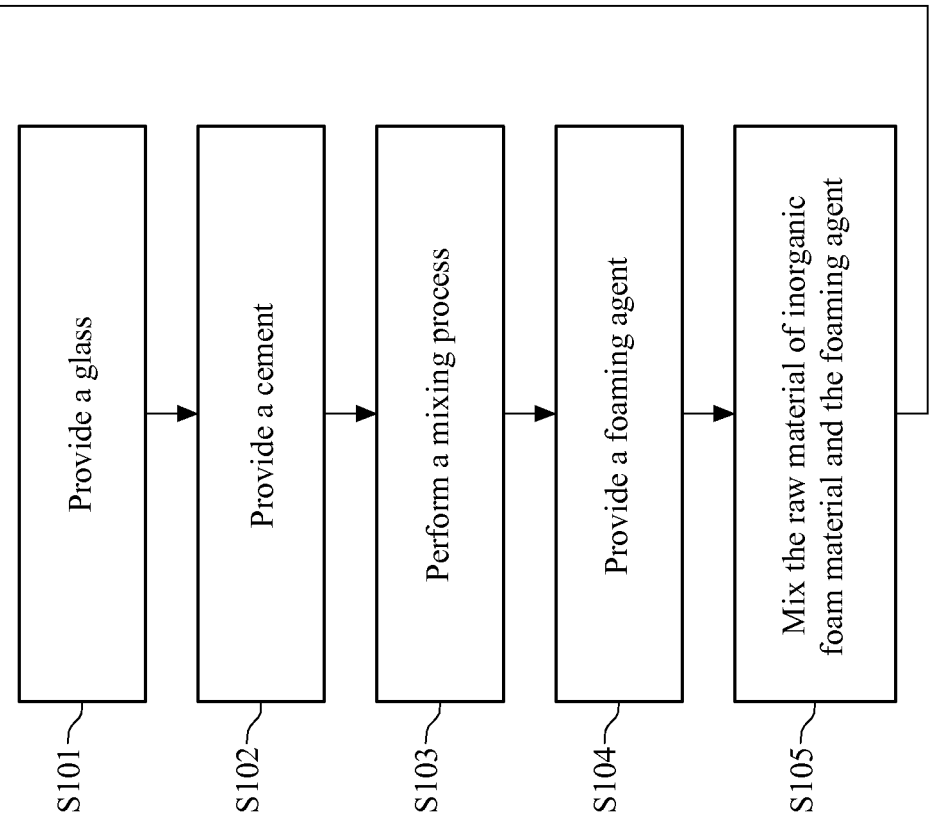

INORGANIC FOAM MATERIAL AND LOW-TEMPERATURE MANUFACTURING METHOD FOR THE SAME

CROSS-REFERENCE TO RELATED APPLICATIONS

This non-provisional application claims priority under 35 U.S.C. §119(a) on Patent Application No(s). 102105139 filed in Taiwan, R.O.C. on Feb. 8, 2013, the entire contents of which are hereby incorporated by reference.

TECHNICAL FIELD

The disclosure relates to an inorganic foam material and a manufacturing method for the same, and more particularly to, an inorganic foam material and a low-temperature manufacturing method for the same.

BACKGROUND

Since the land in the cities is limited, the buildings are built with more and more stories. Lower floors of the buildings need to support the weight of higher floors of the buildings. Therefore, when the buildings have more stories, the lower floors of the buildings need to support more weight. Since each material has a maximum value that the material can bear, the number of stories which the building can be built is limited based on the material the building uses.

In order to increase the stories of the buildings, the materials having lighter weight are used for decreasing the weight which the lower floors of the buildings need to support. That is, the needs for reducing the weight of the non-structural elements of the buildings are increased. In general, cement products, which are made of concrete, are heavy, so that cement products cannot meet the needs for manufacturing high-floor buildings. In addition to environmental and economical aspects, it is important to design building materials, which are light, vibration-proof, capable of insulating heat and saving energy.

According to the prior art, inorganic foam materials, for example, foam glass, foam ceramic, and foam brick, are manufactured under a high-temperature process. The temperature during the process is between 500° C. and 1200° C. Since the inorganic foam materials are sintered under the high temperature, it consumes a large amount of energy, which is environmentally unfriendly.

The inorganic foam materials are environmentally unfriendly because of wasting too much energy and consuming lots of resources during the process. In addition, the conventional process needs to be performed under high temperature, so it is difficult to control the foamability and uniformity of bubbles of the inorganic foam materials. Therefore, the foamability of the inorganic foam materials is lower than expected and the bubbles generated inside the inorganic foam materials are not uniformly distributed. Further, since it is hard to control the conditions of the process, the inorganic foam materials are worse in compressive strength, heat insulation and noise insulation.

Therefore, it is important to solve the problem that the process for manufacturing inorganic foam materials consumes too much energy.

SUMMARY

According to an embodiment of the disclosure, a low-temperature manufacturing method for an inorganic foam material comprises the following steps. A mixing process is performed. The mixing process comprises mixing a glass and a cement to form a raw material of inorganic foam material. A low temperature process is performed. The low temperature process is for forming a gas inside the raw material of inorganic foam material by a foaming agent and for forming an inorganic foam material made from the glass and the cement.

According to an embodiment of the disclosure, an inorganic foam material formed by the low-temperature manufacturing method is disclosed.

BRIEF DESCRIPTION OF THE DRAWINGS

The present disclosure will become more fully understood from the detailed description given hereinbelow, along with the accompanying drawings which are for illustration only, thus are not limitative of the present disclosure, and wherein:

FIG. 1 is a flow chart of a low-temperature manufacturing method for an inorganic foam material.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Please refer to FIG. 1, which is a flow chart of a low-temperature manufacturing method for an inorganic foam material. The steps for the low-temperature manufacturing method for an inorganic foam material are described below.

First, a glass is provided (S101). In this embodiment, the glass is a glass powder, but the disclosure is not limited thereto. The glass comprises, for example, soda-line glass, thin film transistor-liquid crystal display glass (TFT-LCD glass) and Pyrex glass, but the disclosure is not limited thereto. The manufactures can choose the types, the color or the origin of the glass according to their needs. For example, the glass is recycled from the discarded glass, but the disclosure is not limited thereto.

In detail, the diameter of the glass is between 80 meshes and 400 meshes. The glass is grinded by a grinding mill or a ball mill so that the diameter of the glass is decreased to the range of 80 meshes and 400 meshes. Further, the glass is sieved (namely, selected) by a sieve so that the diameter of the glass passing through the sieve is between 80 meshes and 400 meshes. When the diameter of the glass is smaller, the compressive strength of the manufactured inorganic foam material is better.

Then, a cement is provided (S102). In this and some other embodiments, a type I Portland cement and a type III Portland cement are mixed to form the cement. In this and some other embodiments, the ratio of the weight of the type I Portland cement to the weight of the type III Portland cement is between 5:1 and 7:1. In some other embodiments, the ratio of the weight of the type I Portland cement to the weight of the type III Portland cement is 6:1. In some other embodiments, the type I Portland cement and a setting accelerator (for accelerating the reaction of the cement being condensed) are mixed to form the cement.

In this embodiment, the step of providing the glass is performed before the step of providing the cement, but the order of the steps does not limit the disclosure. That is, in some other embodiments, the step of providing the cement is performed before the step of providing the glass.

Afterwards, a mixing process is performed (S103). In detail, the glass and the cement are mixed to form a raw material of inorganic foam material. In this and some other embodiments, the glass and the cement are added into a water first. The weight percentage of the glass is between 3 wt % and 60 wt %, and the weight percentage of the glass is based on the total weight of the raw material of inorganic foam material. When the weight percentage of the cement is greater, the viscosity of the raw material of inorganic foam material at the early stage of the method (i.e., before S107) is stickier. Also, when the weight percentage of the glass is greater, the compressive strength of the manufactured inorganic foam material is better. In other words, when the percentage of the glass is between 3 wt % and 60 wt %, the raw material of inorganic foam material is sticky at the early stage of the process as well as the compressive strength of the manufactured inorganic foam material is better.

In this embodiment, the glass and the cement are mixed by a stirring mixer so that the glass and the cement are uniformly mixed. In this embodiment and some other embodiments, the glass and the cement are mixed by the stirring mixer for 2 to 30 minutes (the mixing time can be shortened to be less than 2 minutes, such as 0.5 minute, when the glass and the cement are mixed by certain stirring mixers). The time for mixing the glass and the cement can be adjusted according to the amount of the glass and the cement. When the time for mixing the glass and the cement is longer, the glass and the cement are mixed more uniformly.

In this embodiment, the step of providing the glass and the cement having the diameter of 80 meshes to 400 meshes is performed before the step of mixing the glass and the cement. In some other embodiments, the glass and the cement are mixed without sieving the glass based on its diameter.

Then, a foaming agent is provided (S104). The foaming agent is, for example, a liquid agent. In this embodiment, the foaming agent is a hydroperoxide solution ($H_2O_{2(aq)}$), but the disclosure is not limited thereto. The weight percentage of the foaming agent is between 0.5 wt % and 10 wt %, and the weight percentage of the foaming agent is based on the total weight of the raw material of inorganic foam material. When the weight percentage of the foaming agent is greater, the foaming agent generates more gas, so that the foamability of the manufactured inorganic foam material is higher as well as the density of the manufactured inorganic foam material is smaller. However, when the weight percentage of the foaming agent is too large, the foaming agent generates too much gas, so that holes having greater sizes are generated in the raw material of inorganic foam material, producing multiple holes with smaller sizes connecting with each other. Thus, the gas escapes from the raw material of inorganic foam material through the holes so that the foaming process is not completed. That is to say, the weight percentage of the foaming agent is an important factor in the density of the manufactured inorganic foam material. When the weight percentage of the foaming agent is smaller, the foaming agent generates less gas, so that the foamability of the manufactured inorganic foam material is lower as well as the density of the manufactured inorganic foam material is greater. The density of the manufactured inorganic foam material is positively correlated with the compressive strength of the manufactured inorganic foam material. The density of the manufactured inorganic foam material is negatively correlated with the capability of heat insulation of the manufactured inorganic foam material. Therefore, the manufactures can adjust the weight percentage of the foaming agent for the density, the compressive strength and the capability of heat insulation of the manufactured inorganic foam material.

Afterwards, the raw material of inorganic foam material and the foaming agent are mixed (S105). In this and some other embodiments, the raw material of inorganic foam material and the foaming agent are mixed by, for example, a stirring mixer. Thereby, the raw material of inorganic foam material and the foaming agent are uniformly mixed.

Then, the raw material of inorganic foam material mixed with the foaming agent is filled in a mold (S106). Since the raw material of inorganic foam material is in fluidity (namely, being flowable) at the early stage of the process, the raw material of inorganic foam material is filled in the mold before shaped according to the shape of the mold. Therefore, manufactures can design the shape of the manufactured inorganic foam material according to the shape of the mold.

Then, a low temperature process is performed (the low temperature process means that the temperature of the process of the embodiment is relatively low when compared with conventional processes), so that the foaming agent produces a gas inside the raw material of inorganic foam material as well as the glass reacts with the cement. In this embodiment, the temperature during the low temperature process is between 5° C. and 65° C. When the temperature is between 5° C. and 65° C., the foaming agent generates gas, and the glass reacts with the cement. When the temperature is higher (still in the range of 5° C. to 65° C.), the strength of the inorganic foam material is better at the early stage of the process, and the inorganic foam material meets the manufactures' needs earlier. In this embodiment, the low temperature process can be divided into a low temperature foaming process (S107) and a curing process (S108) in sequence according to the reactions between the glass, the cement and the foaming agent.

In the low temperature foaming process (S107), the foaming agent generates the gas. In this embodiment, the foaming agent is the hydroperoxide solution, so that the generated gas is oxygen, which corresponds with the hydroperoxide solution. For accelerating the reaction rate of generating the gas, the temperature is elevated or a catalyst is added into the solution for enhancing the foaming agent to generate the gas. In this and other embodiments, the weight percentage of the glass is between 3 wt % and 60 wt %, so that the raw material of inorganic foam material can keep sticky for enclosing the gas generated by the foaming agent. Thus, the raw material of inorganic foam material prevents the gas from escaping from the raw material of inorganic foam material. Therefore, the gas generated by the foaming agent produces individual and enclosed holes inside the raw material of inorganic foam material, and the holes are uniformly distributed inside the raw material of inorganic foam material.

In the curing process (S108), the glass reacts with the cement. The raw material is kept stationary without external forces for 0.5 to 7 days, so that silicon dioxide in the glass ($SiO_2$) reacts with aluminum oxide ($Al_2O_3$) of the cement and forms crystal structures of silicon-oxygen tetrahedron. Thus, the cement hydrates and forms chemical bondings connected with the glass, so that the compressive strength of the manufactured inorganic foam material is improved.

Finally, the inorganic foam material is trimmed (S109) according to the manufactures' needs for the shape of the inorganic foam material. For instance, the size of the inorganic foam material is trimmed according to the manufactures' needs. Thus, the manufacture of the inorganic foam material under a low temperature process is completed (S110). The manufactured inorganic foam material can be applied in different uses, such as light materials for compartments, ceilings, energy saving walls, heat insulation boards, fireproof doors, shells of electronic devices and cushion foams. The products have good performances on noise insulation, thermal insulation and fireproof.

The inorganic foam material is made from the glass and the cement by the foaming process, so that the manufactured inorganic foam material includes the holes and the density of the manufactured inorganic foam material is small. The density of the manufactured inorganic foam material is between 0.10 g/cm$^3$ and 0.40 g/cm$^3$, so that the manufactured inorganic foam material is a light inorganic foam material. With regard to the compressive strength of the inorganic foam material, the glass and the cement hydrate and form chemical bondings, so that the compressive strength of the manufactured inorganic foam material is greater than or equal to 500000 Pascal, which is improved. With regard to heat insulation, the holes inside the inorganic foam material reduce the heat conduction inside the inorganic foam material, so that the thermal conductivity (i.e. insulation factor) of the inorganic foam material is less than 0.1 W/(m×K). In some of the embodiments, the thermal conductivity of the inorganic foam material is less than 0.07 W/(m×K). The heat insulation of the inorganic foam material is improved. In addition, since the holes inside the inorganic foam material are uniformly distributed, the manufactured inorganic foam material is able to insulate noise, is fireproof, as well as featuring low water absorption and low shrinkage.

According to the inorganic foam material and the low-temperature manufacturing method for the same of the disclosure, the inorganic foam material is made from the glass and the cement and the weight percentage of the glass is between 3% wt and 60% wt. Therefore, the foaming agent generates a gas and the glass reacts with the cement to form an inorganic foam material under 5° C. to 65° C., as well as the compressive strength of the manufactured inorganic foam material is improved. Thus, the disclosure solves the problem that the inorganic foam material is manufactured under a high-temperature (higher than 500° C.) process and wastes too much energy and consumes too many resources. Thereby, the inorganic foam material and the low-temperature manufacturing method for the same are environmentally friendly and are capable of saving energy.

In addition, the weight percentage of the glass is between 3% wt and 60% wt, so that the raw material of inorganic foam material mixed by the glass and the cement can keep sticky status for preventing the gas from escaping from the raw material of inorganic foam material. Therefore, the holes formed by the gas are uniformly distributed inside the manufactured inorganic foam material and the holes are enclosed inside the inorganic foam material. That is, the foamability of the inorganic foam material is greater, so that the density of the inorganic foam material is smaller. Also, the holes inside the inorganic foam material reduce the heat conduction inside the inorganic foam material so that the heat insulation of the inorganic foam material is improved. Further, the inorganic foam material is capable of insulating noise, being fireproof, featuring low water absorption and low shrinkage because the holes are uniformly distributed inside the inorganic foam material.

In addition, the inorganic foam material is manufactured from the recycled glass. Thus, a method for reusing recycled glass is provided. Therefore, the amount of discarded glass can be reduced and the resource is recycled.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for manufacturing an inorganic foam material, comprising:
    mixing a type I Portland cement and a type III Portland cement to form a cement mixture, wherein a weight ratio of the type I Portland cement and the type III Portland cement in the cement mixture is between 5:1 and 7:1;
    mixing a glass and the cement mixture to form a raw material;
    adding a foaming agent to the raw material to form a foaming mixture; and
    keeping the foaming mixture between 5° C. and 65° C., such that a gas is produced by the foaming agent inside the foaming mixture, and the inorganic foam material is formed.

2. The method according to claim 1, wherein the glass is present in an amount between 3 wt % and 60 wt %, and the weight percentage is based on the total weight of the raw material.

3. The method according to claim 1, wherein the diameter of the glass is between 80 mesh and 400 mesh.

4. The method according to claim 1, further comprising:
    providing a water; and
    mixing the water and the raw material.

5. The method according to claim 1, wherein the foaming agent is a hydroperoxide solution, and the gas is oxygen.

6. The method according to claim 1, further comprising:
    providing a mold; and
    filling the foaming mixture into the mold.

7. An inorganic foam material formed by the method according to claim 1.

8. The inorganic foam material according to claim 7, wherein the density of the inorganic foam material is between 0.10 g/cm$^3$ and 0.40 g/cm$^3$.

9. The inorganic foam material according to claim 7, wherein the compressive strength of the inorganic foam material is greater than or equal to 500000 Pascal.

10. The inorganic foam material according to claim 7, wherein the thermal conductivity of the inorganic foam material is less than 0.07 W/(m×K).

* * * * *